July 17, 1962  M. E. BLAIS ETAL  3,044,231

APPARATUS FOR APPLYING BALE BAGS TO A BALE BAG HOLDER

Filed Jan. 30, 1961  8 Sheets-Sheet 1

INVENTORS.
MAURICE E. BLAIS.
WATER RUF.
BY JOSEPH E. DiMEGLIO.

ATTORNEYS.

United States Patent Office 3,044,231
Patented July 17, 1962

3,044,231
APPARATUS FOR APPLYING BALE BAGS TO A BALE BAG HOLDER
Maurice E. Blais, Pawtucket, Walter Ruf, Barrington, and Joseph E. DiMeglio, Providence, R.I., assignors to St. Regis Paper Company, New York, N.Y., a corporation of New York
Filed Jan. 30, 1961, Ser. No. 85,639
13 Claims. (Cl. 53—55)

This invention relates to baling machines, and more particularly to apparatus for automatically applying at high speed empty bale bags of the open mouth type to a bale bag holder device which is initially in a relatively contracted condition ready to receive a bale bag mouth and which is expandable to stretch open the bale bag mouth to prepare the bale bag to receive a charge, for example, of small bags.

Bale bag applicator apparatus of this general type which have been heretofore suggested in the prior art have suffered the disadvantages of being too slow and, for example, have been unable to keep up with the speed of the bale charging apparatus. Further, such prior apparatus have failed to maintain positive and accurate control of the bale bags under circumstances wherein the succession of such bags have been free of damage due to handling by the bale bag applicator apparatus, and wherein the percentage of bale bags split or torn by the machine, have been negligible.

One of the objects of the present invention is to overcome the above disadvantages or to reduce same to negligible proportions.

The invention, in one aspect thereof, is constituted by a bale bag applicator apparatus including a pair of channel-like elements, which are sometimes referred to as duck bill elements, which are mounted for relative movement, preferably angular movement, about a fixed pivot axis. Such channel-like elements are adapted for having slipped thereover the mouth of a bale bag which thereafter can be filled with a charge of other articles which may be inserted in the bale bag via the channel-like elements. The latter are normally in a relatively closed or contracted position when the bale bag is slipped thereover and are expandable to a relatively open position which stretches open the mouth of a bale bag preparatory to receipt of such charge. A bale bag rack is provided which is formed for holding a single bale bag in readiness to be so applied to the channel-like elements. Means also are provided for grasping a bale bag from said rack, holding open the mouth thereof and then moving to a suitable station wherein it applies the bale bag mouth over the channel-like elements. Said means embraces a bale applicator arm device which is mounted for the above-mentioned purpose, for example, for angular movement between a position wherein it can grasp a bale from said rack and another position wherein it so applies the open mouth of the bale over the channel-like elements. Means also are provided for moving the bale applicator arm device between the aforementioned positions. In a preferred form, a bale bag is positioned in the aforementioned rack with its mouth down. Two arms of the applicator arm device have mounted thereupon bale bag mouth grasping means which, for example, can comprise four pairs of plier-like jaws or gripper fingers which are positioned for grasping the edges of the bale bag in the corner regions thereof and holding same open while the bale bag is applied to the channel-like elements. Preferably but not mandatorily the bale bag mouth is preliminarily opened while in the bale bag rack preparatory to having the edges of the mouth thereof grasped by the aforementioned gripper fingers. Thus suitable means are provided for opening preliminarily the bale bag mouth while in the rack and such may embrace means for mounting parts of the bale bag rack for spreading movement to facilitate such preliminary opening of the bale bag. Means are also provided for inserting bale bags consecutively into the rack in selected timed relationship to be grasped one at a time by the aforementioned bale bag applicator arm device and thus applied consecutively to the channel-like duck bill elements. Also, in one form of the invention means are provided for sensing the presence of a torn or defective bale bag mouth as applied over the channel-like elements, such means comprising, for example, one or more fluid conduits each having an orifice at the surface of a channel-like element for conducting a fluid under pressure such as air, there being connected thereto a device for sensing a change in fluid pressure responsive to a loose fit of the mouth of a bale bag over said channel-like elements, such loose fit being in turn caused by, for example, a tearing of the bale mouth. Suitable control means are provided for controlling the sequence of operations of the several parts of the apparatus aforementioned, such control means embracing means for temporarily rendering inoperative the apparatus in response to such sensing of a loose fit or tearing of a bale mouth as applied to the channel-like elements.

If desired, in one form of the invention, the bale bag can be preliminarily opened as aforementioned while in the bale bag rack and thus prepared for being grasped by the gripper means of the transfer arms, or alternatively, the bale bag mouth need not be so preliminarily opened but may be opened while in transit from the bale bag rack to the duck bill or channel-like elements, the opening of the bale bag mouth being accomplished, for example, by suction devices which act upon opposite sides of the bale bag while so in transit. Further alternatively, the bale bag mouth may be only slightly and preliminarily opened while in the bale bag rack just enough to permit the jaws or plier-like gripper fingers at each corner region to grasp same (said gripper fingers being affixed to the transfer arms), and the bale bag mouth can be opened further while in transit by spreading apart the corresponding double pairs of gripper fingers on opposite sides of the bale bag thereby to open the bale bag mouth adequately to permit it to be slipped over the duck bill elements by the time the transfer arm device has reached such duck bills. In addition to providing means for so opening up the mouth region of each bale bag, there may be provided means for opening up the bale bag near the bottom region thereof concurrently so that when the bale bag is withdrawn from the rack, it is at least partly open throughout its length rather than only at the mouth region.

The above and further objects and novel features of the invention will more fully appear from the detailed description set forth below when read in connection with the accompanying drawings, it being understood that the latter are for purposes of illustration only and do not define the limits of the invention, reference for this latter purpose being had to the appended claims.

Summary of Operation

Figures 1, 2:
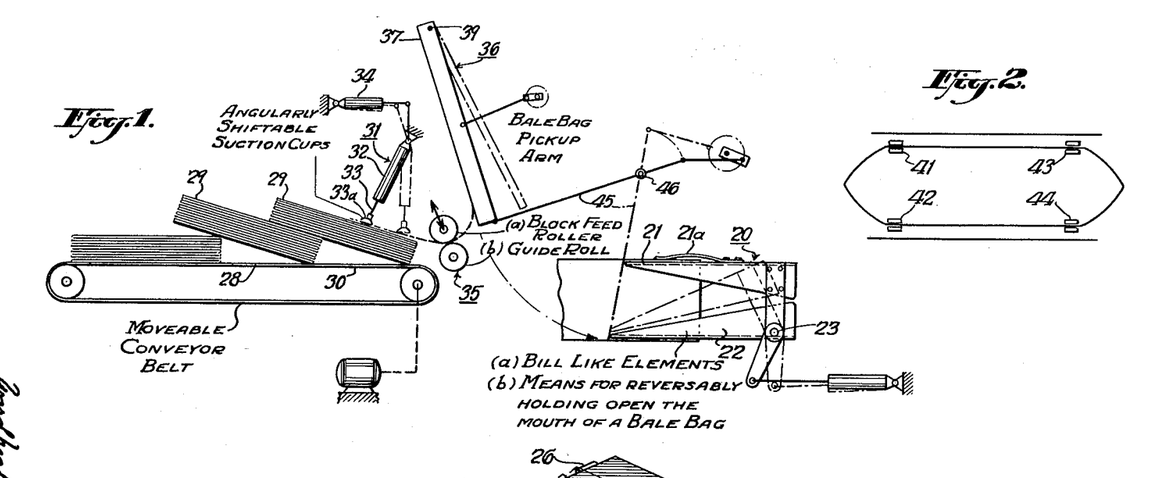
FIG. 1 is an abbreviated schematic representation of one form of the present invention.
FIG. 2 is an end view of a bale bag positioned in a bale bag rack employed in the present invention, and showing four pairs of bale bag gripper jaws or fingers grasping the mouth of the partially opened bale bag in the corner regions thereof.
Figure 3:
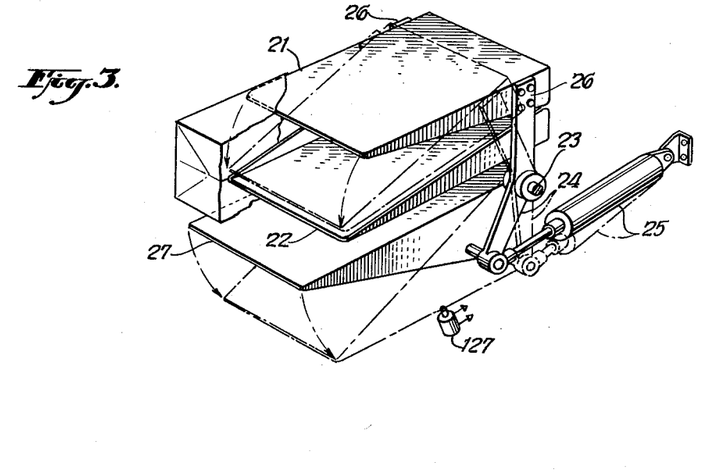
FIG. 3 is a perspective view of a pair of duck bill or channel-like elements employed in the present invention and over which the bale bags are applied automatically by the present apparatus.

There will now be set forth a brief summary of the operation of the apparatus with particular reference to FIGS. 1–3.

A pair of channel-like elements 20 which are sometimes referred to herein as duck bills or bill-like elements are provided over which the mouths of the bale bags are fitted automatically by the present apparatus. The duck bills 20 embrace an upper duck bill 21 and a lower duck bill 22 which are mounted for pivotal movement about the axis of a shaft 23 whereby the upper duck bill can be angularly moved relative to the stationary lower duck bill, as well shown in FIG. 3. A lever 24 is provided for pivotal movement about the shaft 23 in response to the action of a power cylinder 25 thereby to open and close the duck bills. As shown in FIG. 3, the uppermost duck bill 21 is rigidly secured to a pair of upstanding support arms 26 which are angularly shiftable via the lever 24 and power cylinders.

A table 27 is provided beneath the lowermost duck bill 22 which is angularly shiftable with the upper duck bill 21 between an uppermost position shown in solid lines in FIG. 3 and a lowermost position shown in broken lines.

When the duck bills are relatively closed and the table is in its lowermost position, an open mouth bale bag is fitted thereover, as will be set forth hereinafter. The automatic bale bag applicator embraces a conveyor 28 upon which a plurality of bale bags, preferably in a plurality of similar groups or "hands" 29, are fed to a discharge station 30 where they are positioned for being picked up consecutively by a bale bag pickup arm 31.

The bale bag pickup arm 31 embraces a power cylinder 32 having a piston rod 33 adapted for vertical reciprocal motion in order to lift a top bag, from one of the groups 29 on the conveyor 28, to a selected level whereupon the pickup arm 31 is shifted angularly, as by a power cylinder 34, to insert the leading bottom edge of the bale bag between a pair of bale rack feed rollers 35.

The piston rod 33 is provided preferably with suction means in the form of cups 33a for picking up each of the bale bags.

The rack feed rollers 35 initially are open or spread apart in parallel relation and upon the insertion therebetween of the leading bottom edge of a bale bag they are closed and rotate thereby to advance the bale bag bottom up into a bale bag rack 36. The bale bag rack 36 is preferably constructed so that it can open up or expand, at least at the bottom extremity thereof, to facilitate the preliminary opening of the mouth of the bale bag while in the bale bag rack thereby to prepare the mouth of the bale bag for being grasped by a suitable bale bag transfer or applicator arm device to be described hereinafter.

Thus the bale bag rack 36, in one form of the invention, embraces two hinged sections 37, 38 whereby the bale bag rack is in the nature of a box having a hinged lid or at least the upper half of which is hinged to the lower half. Thus primary section 37 of the bale bag rack 36 is hingedly associated with secondary section 38, such sections being hinged together for pivotal movement about a pivot 39.

Suitable means, to be described more fully hereinafter, are provided for grasping the bale bag (while in such rack) near the mouth thereof which is in the lower part of the rack and preliminarily opening same in response to the opening of the rack sections 37 and 38. Thus the uppermost section 38, as viewed in FIG. 1, is preferably movable relative to the lowermost section 37 which may be fixed. This relative movement, which accomplishes the spreading of the sections of the bale bag rack, may be brought about by means of a rotatable crank to appear later.

When the bale bag is thus so preliminarily opened the mouth thereof is in the condition shown in FIG. 2, which is viewed from the bottom, wherein the bale bag mouth is situated in the lower part of the rack and is positioned to be grasped by four pairs of plier-like jaws or gripper fingers 41–44, inclusive.

The gripper fingers 41–44, inclusive, are mounted upon a bale bag applicator or transfer arm device 45 which is mounted for movement between a primary station, as shown in solid lines at FIG. 1, wherein it can grasps the open mouth of the bale bag while in the rack, and a secondary position, as shown in broken lines in FIG. 1, wherein it applies the open mouth bale bag to the duck bill or channel-like elements 20.

In the form shown, the applicator or transfer arm device 45 is mounted for pivotal movement about a shaft 46 under the influence of a crank also to appear more fully hereinafter.

When the transfer arm device 45 approaches the limit of its angular motion in a counterclockwise direction (FIG. 1), the gripper fingers 41–44 are opened up and the transfer arm device thus is disengaged from the mouth of the bale bag. The transfer arm device is now in a position to be returned to the station for picking up another bale bag. In order to avoid colliding with the duck bills and the bale bag which it has just applied thereto, the two transfer arms (of the transfer arm device) are spread part, as will be set forth hereinafter, for the return stroke to the leftmost position, as viewed in FIG. 1.

Figure 4:
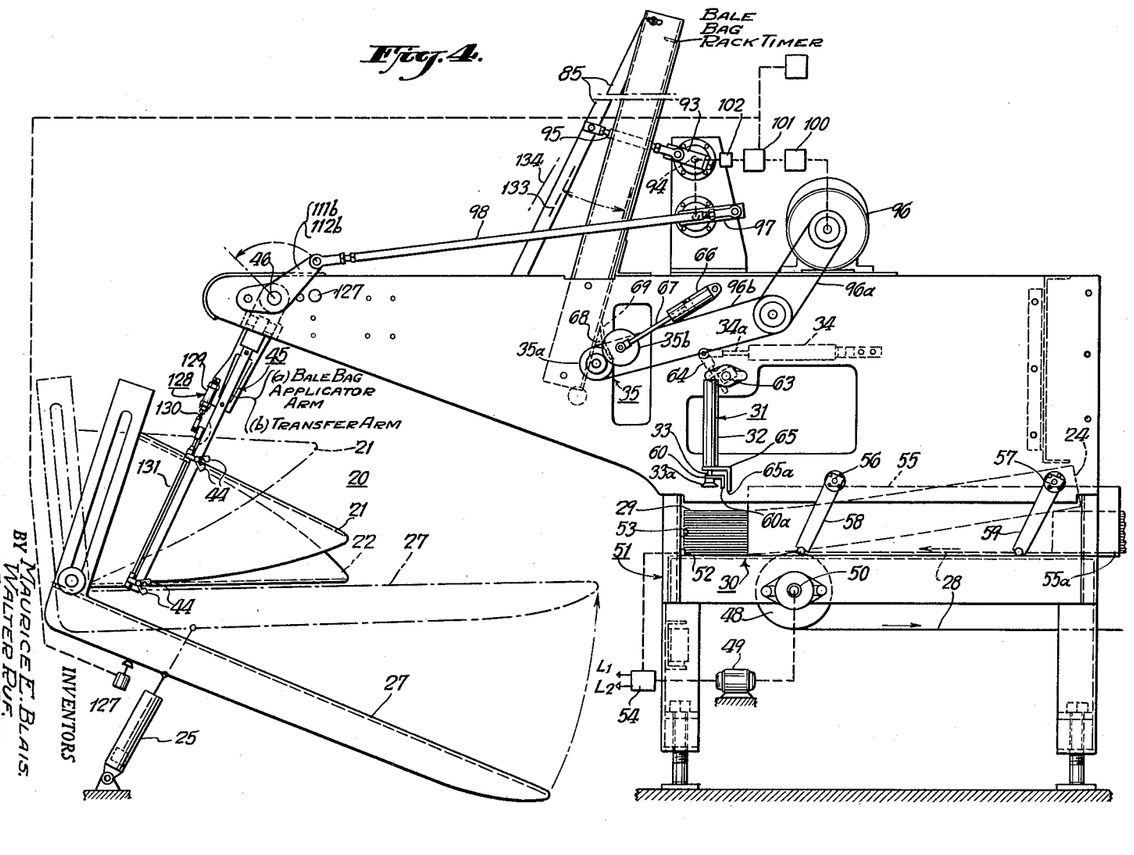
FIG. 4 is a side elevation showing certain of the main elements of one form of apparatus embodying the present invention.

Apparatus of FIG. 4

Referring now to FIG. 4, there will be described in more detail certain of the parts of the apparatus briefly described above in connection with FIGS. 1–3.

The conveyor 28, in the form shown, comprises an endless belt mounted for movement over suitable rollers, one of which is shown at 48, and which is operatively connected to an electric motor 49 to be turned thereby, as will now be described. The roller 48 is mounted upon a shaft 50 which in turn rests in suitable bearings upon a main frame 51 of the apparatus. In alignment with the plane of the upper run of the belt 28 there is situated a microswitch 52 which is in the path of the bale bags which are urged to the left, as viewed in FIG. 4, by means of such conveyor 28. The switch 52 is situated below a bag stop plate 53. Such switch is operatively connected to a control device 54 for the motor 49, the control device 54 being suitably energized by electrical energy from a source (not shown). The switch 52 is actuated by a group of bags coming up against it thereby temporarily to deenergize the conveyor motor 49 and thus to hold the leftmost group of bags on the conveyor 28 in position for being picked up and to be urged into the rack feeding rollers 35.

Preferably the bale bags on the conveyor 28 are situated in separate groups as described above in connection with FIG. 1, for example, of 25 each, and these groups may be situated in shingle arrangement so that the bale bag pickup arm 31 will pick up consecutively all of the bags of such a group, prior to the advance, by means of the conveyor 28, of the next group of bale bags into the bag pickup station 30.

Thus the switch 52 is so positioned near the bottom of the bale bag stop plate 53 so that when the lowermost bale bag of a given group or "hand" has been picked up, the switch 52 will then be actuated to energize the conveyor motor 49 thereby to advance the next group of bags into position 30.

Figure 6:
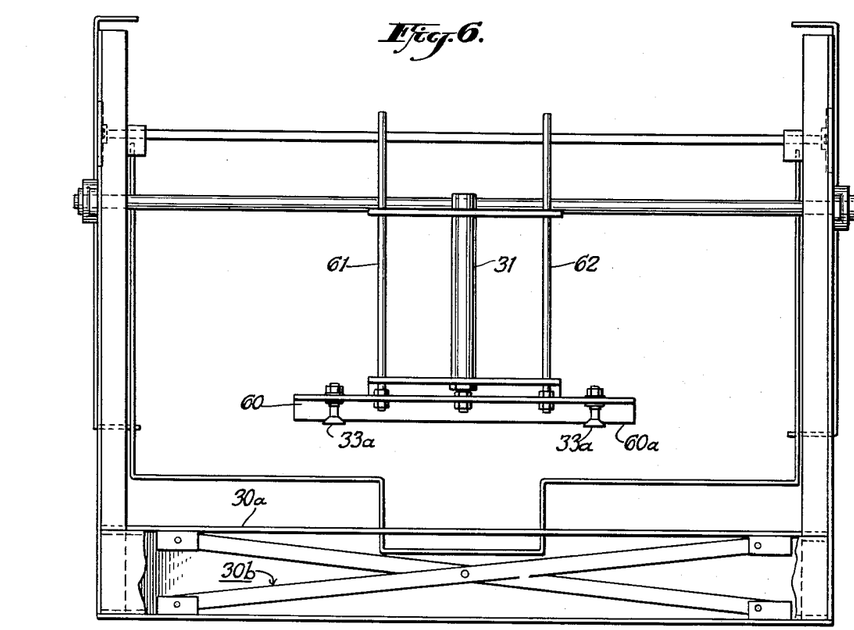
FIG. 6 is an end view of portions of a bale bag conveyor apparatus shown in FIG. 4.
Figures 7, 8:
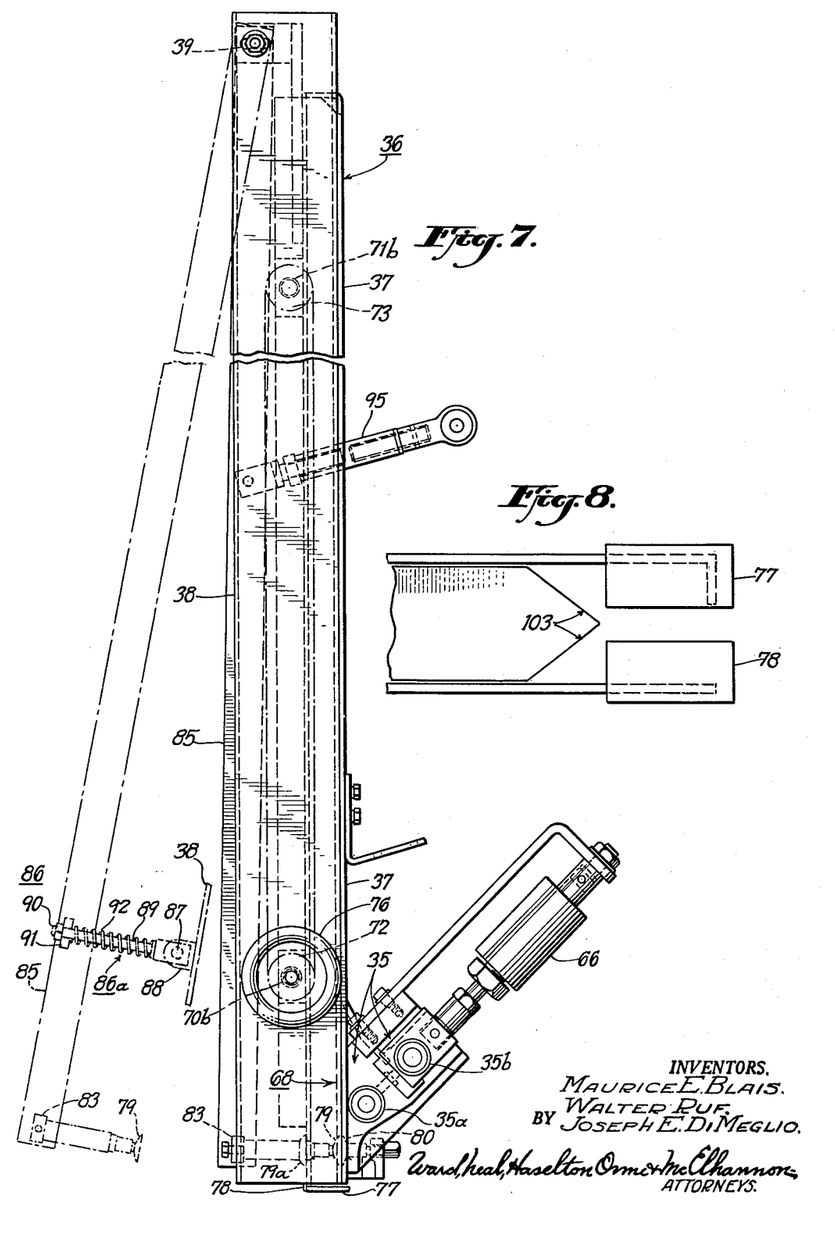
FIG. 7 is a side view of a bale bag rack employed in the present invention.
FIG. 8 is a fragmentary end view from below of the bale bag rack shown in FIG. 7 showing parts thereof spread apart.

Referring to FIGS. 4, 6 and 7, the bale bags, such as the leftmost group 29 (FIG. 4), are guided to the bale bag pickup or discharge station 30 by means of a pair of guide plates 55 which are positioned on opposite sides of the conveyor 28 and which, at their righthand extremity 55a (FIG. 6), may be outwardly flared to aid in guiding each group of bags therebetween. Each of the side guide plates 55 may be mounted for reciprocal angular movement about parallel shafts 56 and 57 by means of supporting links 58 and 59, respectively, the latter at their lower extremities being pivotally associated with their respective side guide plates 55.

The guide plates 55, as aforementioned, are two in number, one on each side of the conveyor 28 and press relatively lightly upon the conveyor belt 28 and perform the function of aligning the sides of the bag so that they are in accurate attitude for being picked up by the pickup arm 31. The ends of the bale bags are suitably aligned by being thrust, by means of the conveyor 28, against the end stop 53. Thus an accurate alignment of both the ends and the sides of the bale bags is obtained by means of the moving conveyor 28 and such guide plates.

As viewed in FIG. 6, there may be provided a device for raising or lowering a plate 30a by means of a panograph device 30b which is located beneath the discharge station 30 thereby to regulate the level of the lefthand extremity of each group of bale bags so that it can be easily picked up by means of the pickup arm 31.

Although in one form of the invention it has been found advantageous to feed the bags in the aforementioned groups in shingle relationship, as shown in FIG. 1, the invention is not limited thereto.

*Bale Bag Pickup Means*

The bale bag pickup means will now be described in further detail, reference being had to FIG. 4. Pickup arm 31, as aforementioned, embraces the power cylinder 32 having a piston rod 33, to the lower extremity of which is secured suction cups 33a of which there are two in number, as viewed in FIG. 6, on or near opposite extremities of a supporting bar 60. The latter is mounted for vertical reciprocal motion while horizontal under the influence of the power cylinder 31, this being accomplished with the aid of suitable guide bars, 61 and 62.

The bale bag pickup arm 31 is normally in a vertical attitude, as shown in FIG. 4, but is mounted for pivotal movement about the axis of a shaft 63 under the influence of the aforementioned power cylinder 34 having a piston rod 34a which is associated with a crank lever 64 which in turn is secured to the pickup arm 31 for moving same angularly about the axis of shaft 63.

For the purpose of ironing out longitudinal kinks or creases in the several bale bags as they are fed to the bale bag rack 36, there is secured to the lowermost extremity of the piston rod 33 and slightly above the suction cups 33a, an element which in side view, as shown in FIG. 4, is in the shape of an angle bar, this being the bar 60 above described. The lowermost face 60a of this angle bar 60 is substantially on the same level as the lowermost faces of the several suction cups 33a and when the bar 60 is thrust downwardly by the power cylinder 31 in conjunction with the suction cups 33a, the bar 60 presses against the top of the leftmost group of bags and thus flattens out any mounds or longitudinal kinks or creases concurrently with the grasping of the upper surface of the top bale bag by means of such suction cups. When this occurs a control device (to appear later) causes the power cylinder 32 to be actuated to return to the position shown in FIG. 4 and thereby to lift with it the topmost bale bag thereby performing the following function:

There is attached to the lowermost extremity of the power cylinder 32 another bar 65, the lowermost face 65a of which is situated, when the parts are in the position shown in FIG. 4, somewhat below the face 60a of the bar 60. The function of the bar 65 is slightly to tilt or cant the left-hand edge or marginal region of the bale bag for the purpose of insuring that any bale bag therebeneath which may stick or follow it, will break away and fall back upon its group of bags. It also serves the function of aiding, in cooperation with the suction cups 33a, in maintaining the flattened condition of the left end margin of the bale bag (FIG. 4), thereby preventing a recurrence of any longitudinal creases or mounds therein.

In this condition, the leftmost region, namely, the bottom of the bale bag, is now ready to be shifted angularly clockwise, as viewed in FIG. 4, so that it is thrust between the now open rack feeding rolls 35.

*Rack Feed Rolls*

The rack feeding rolls 35 are arranged to avoid a canting or skewing of the bale bags as they are thrust into the bale bag rack. Accordingly, the rack feeding rolls are, at this stage in the cycle of operation, separated or spread apart in parallel relationship in order to permit the pickup arm 31 to insert the leading portion of the bale bag between such separated rolls to avoid the aforementioned canting or skewing. When the leading edge of the bottom of the bale bag is pushed between such rolls, the latter are pressed together, suction is removed from the cups 33a and the pickup arm 31 is disengaged from the bale bag. Thereafter the rack feed rolls 35 advance the bale bag into the substantially upstanding rack 36. The rack feed rolls are respectively designated 35a and 35b, and the former one preferably is mounted upon a relatively stationary axis, the latter being reciprocably mounted relative to the former under the influence of a power cylinder 66 which is operatively connected to the roll 35b via a link 67 (FIG. 4).

The feed rolls 35 thus automatically advance the bale bag past the face 65a of the bar 65. This relieves the now retracted suction cups 33a of wear and also aids in smoothing out the bale bag as it is moved up into the rack 36.

The bale bag rack 36 has an inlet opening at 68 which is provided with a curved in-guide plate 69.

*The Bale Bag Rack (FIGS. 7, 8, 9 and 9a)*

As set forth above in connection with FIG. 1, the bale bag rack 36 embraces a relatively stationary or lower section 37 and a relatively movable or pivotal upper section 38, the latter being pivotable about the axis of shaft 39. The reason for so constructing the bale bag rack 36 is to permit a partial opening of the bale bag mouth while in the rack thereby to facilitate the application thereof to the duck bills, as will be more fully set forth hereinafter.

The lowermost or relatively stationary section 37 of the rack is preferably a flat plate member which extends across the bottom or the back of such rack. However, the uppermost or pivotable portion 38, in the form shown, preferably comprises a plurality of substantially vertically extending strips or bars 38a, 38b, 38c and 38d collectively designated as bale bag top guides which are well shown in FIG. 9. Such top guides are secured together by suitable horizontally extending bars and adapted for movement angularly together about the axis of the shaft 39, as aforementioned.

Means are provided for widening and narrowing the bale bag rack in order to accommodate bale bags of differing sizes. Such means (FIG. 9) embrace side guide plates 38e and 38f respectively on the left and right sides of the bale bag rack. A pair of rotatable parallel threaded bars 70 and 71 pass through perforations in the top guides 38a, b, c and d and are secured by suitable collars, such as 72 and 73 respectively, to metal strips 74 and 75, which in turn are secured to pivot straps 74a, 75a. The latter are shiftable axially via collars 74b, 75b respectively along the shaft 39. The side guide plates 38b, 38c are respectively secured to the strips 74, 75.

The lefthand portions 70a and 71a of the two horizontal threaded bars 70, 71 are formed with lefthand threads, whereas the righthand portions thereof, 70b and 71b, are formed with righthand threads. The two bars 70, 71 are operatively interconnected as by chain means 70c. A handwheel 76 is secured to the righthand extremity of the threaded bar 70. By manually turning the bar 70 via the handwheel 76, the left and righthand sides of the pivotable portion of the bale bag rack can be spread apart or brought closer together by virtue of collars 70d, 70e and 71c, 71d which hold such bars against axial movement by coacting with top guides 38b and 38c which are restrained from shifting axially of shaft 39.

The bale bag rack 36, in order to support a bale bag "mouth down" therewithin, is provided with corner floor plates 77 and 78 (FIGS. 7 and 8) on each side thereof, that is, on the righthand extremity, as viewed in FIG. 8, there are such corner floor plates and analogously there are provided similar ones on the lefthand extremity. Such corner floor plates are relatively short, as shown in FIG. 8, and thus extend from the corner toward the center thereof only a small distance to support the corner portions of the mouth of the bale bag when it is so positioned in the rack. The reason for restricting the size of such corner floor plates is to facilitate the removal of the bag by spreading the two sections 37 and 38 of the bale bag rack and concurrently opening the mouth of the bag through suction means, now to be described, and thus to narrow the bale bag mouth, as shown in FIG. 8, so that its corner regions are pulled in out of contact with the corner floor plates thereby to make possible the removal of the bale bag from the bottom of the bale bag rack.

The preliminary opening of the bale bag mouth in the bale bag rack 36 is accomplished, in the form shown (FIGS. 7 and 9a) by two or more pairs of opposed suction cups 79, 80 and 81, 82.

Obviously, such pairs of suction cups 79, 80 and 81, 82 must be initially separated sufficiently to permit an empty bale bag to fall downwardly fully and to rest upon the floor plates 77, 78 (FIG. 8) prior to opening same. Accordingly, the suction cups, such as 79 and 81 (FIG. 9a), must be moved to the left, as viewed in FIG. 7, to a retracted position represented by 79a. Thereafter the suction cups are urged together to grasp the opposite sides of the bale bag and then are spread apart for the preliminary opening of the bale bag mouth.

The means for accomplishing this in the form shown comprise a bar 83 (FIG. 9) upon which are mounted the two movable suction cups 79 and 81. The bar 83 is horizontal, as viewed in FIG. 9, and is mounted for such spreading movement relative to the lower or stationary section 37 of the rack 36 by means of a pair of parallel suction arms 84 and 85 which mount at their lowermost extremity therebetween said bar 83 and which, at their upper extremities, are mounted for pivotal movement about the axis of the shaft 39.

Thus the suction arms 84, 85 are able to move relative to the upper section 38 of the bale bag rack 36 for the purpose aforementioned of retracting same to permit the bale bag to fall to its lowermost position upon the corner floor plates 77 and 78 and thereafter to facilitate the closing of the opposed pairs of suction cups 79, 80 and 81, 82 and then to permit the separation of such opposed pairs of suction cups preliminarily to open the bale bag mouth, the two sections 37, 38 of the bale rag rack being also spreadable to facilitate the opening of the bale bag mouth and also the removal of the bale bag from the rack 36.

This is accomplished by any suitable means in the form shown (FIG. 7), by a limit-stop arrangement generally designated 86 embracing a pair of identical limit-stop devices 86a, 86b. Such limit-stop arrangement permits the above-described relative motion between the suction arm assembly 83–85, inclusive, and the upper section 38 of the bale bag rack 36.

The limit-stop arrangement 86 will now be described. The suction arms 84 and 85 have associated with them respectively the limit-stop devices 86a and 86b, only one of which 86a (FIG. 7) will now be set forth. Pivotally secured to a portion of the pivotable upper section 38 of the rack 36 by means of trunnions 87 which engage suitable shoulders 88 is a limit-stop rod 89 which thus is pivotally associated with the upper section 38 and further is provided with a rod head 90 which coacts with a collar 91 secured to the suction arm 85. Embracing the limit-stop rod 89 is a coil spring 92 which is interposed between the collar 91 and the shoulders 88. Thus the section 38 and the suction arms 85 are resiliently urged apart but they can be squeezed together by compressing the spring 92 and thus separating the shoulder 91 from the limit-stop rod head 90.

However, it will be noted that, by controlling the angular position of the suction arms, it is possible to govern the position of the rack section 38. Thus it is possible to bring the suction arms 84, 85 to such a position that the suction cups 79 and 81 are in the position symbolized by 79a (FIG. 7), at which stage the section 38 of the bale bag rack is resiliently urged against its rightmost limit-stop (FIG. 7) and yet the suction cups of the opposed pairs 79, 80 and 81, 82 are adequately separated to permit a bale bag to fall to its lowermost position within the rack 36. In this condition the spring 92 is not fully compressed and thus it is possible further to move the suction arms 85 to bring the opposed suction cups 79, 80 and 81, 82 together, thereby further to compress the spring 92, and thereafter angularly to shift the suction arms 84, 85 to the left, as viewed in FIG. 7, and hence to open the bale bag mouth and to entrain, via the collar 91 engaging the rod head 90, the upper or pivotable section 38 of the bale bag rack and to spread the lowermost portion of the rack concurrently with the opening of the bale bag mouth.

Such relative angular motion of the suction arms 84, 85 and the upper portion 38 of the rack is accomplished, in the form shown, by means of a crank 93 (FIG. 4) which is angularly shiftable about the axis of a shaft 94, such crank being connected to the suction arms 84, 85 via a link 95. The crank 93 is of adjustable throw and thus can be adjusted between selected limits to give either a long or a short angular displacement of the suction arms 84, 85.

One of the main purposes of this portion of the apparatus is found in the fact that the bale bag rack 36 in its closed condition, as shown in solid lines in FIG. 7, is relatively narrow and is designed for the purpose of containing a single closed bale bag. In this form of the invention, the bale bag mouth is to be partly opened while in such rack to permit the gripper fingers 41–44 to grasp same. If the bale bag mouth is to be so opened here, it is desirable to open the rack adequately to permit the gripper fingers 41–44 (FIG. 2) easily to grasp the partially opened bag mouth to transfer it to the duck bills. Thus there is provided the means for operatively interconnecting the suction cup arms 84, 85 and the upper section 38 of the bale bag rack 36 to permit the relative angular movement of such suction arms 84, 85 so that there can be, within selected limits, angular motion of the suction cups to permit the bale bag in the rack to fall down upon the corner floor plates 77, 78 while the suction cups are retracted for this purpose.

At the outset of the operation of the apparatus (which will be set forth more fully below) the crank 93 is in such a position that the suction cups 79, 80 and 81, 82 are partially separated to permit the bale bag mouth so to fall to the bottom of the rack. Thereafter, the crank 93 is actuated to cause the suction arms 84, 85 to shift to the right, as viewed in FIG. 7, whereupon the opposed pairs of suction cups grasp the opposite sides of the bale bag mouth and are thus prepared to open them. The spreading of the two sections 37, 38 of the bale bag rack 36 to the condition as shown in FIG. 8 narrows the transverse dimension of the bale bag mouth so that a corner region 103 thereof is no longer in engagement with the corner floor plates 97, 98 but rather is moved to the position shown in FIG. 8 wherein the bale bag can be removed from the spread apart sections of the bale bag rack. If the bale bag were not so narrowed in transverse dimension, it could not be removed from the bale bag rack. Thus the dimensions of the corner floor plates 77 and 78 are selected so that when the sections 36, 37 of the bale bag rack are so spread the bale bag mouth will be sufficiently narrow so that the bale bag mouth is clear of the floor plates and can be easily moved from the rack in the manner aforementioned.

While in a preferred embodiment of the present invention, the bale bag mouth is opened at the station comprising the bale bag rack, it is possible preliminarily partly to open the mouth of the bale bag in the rack only just enough so that it can receive the four pairs of gripper fingers 41–44 (FIG. 2) and no more, whereupon the means for supporting these gripper fingers (e.g. the transfer arm device 45) can shift angularly to apply the bale bag mouth to the duck bills while such fingers are spread apart to open the bale bag mouth while in transit, that is, while it is being shifted from the bale bag rack onto the duck bills. While in the present form of the invention it is shown that the transfer arm device 45 shifts angularly, the invention is not limited thereto, it being possible to accomplish the transfer of the bags by a linear motion of a suitable transfer device.

*Drive Motor Means (FIG. 4)*

A drive motor 96 is provided for driving the aforementioned crank 93 to the suction arms 84, 85 and also for driving a crank 97 which, via a link 98, is operatively connected to a pair of levers 111b and 112b of the transfer arm device 45 (FIG. 4) as will be described below.

The motor 96 also is operatively connected to certain of the other movable elements including the lowermost feed rack roll 35a, as will now be set forth.

As is schematically shown in FIG. 4, the motor 96 is operatively connected to the cranks 93 and 97 via a suitable reduction gear 100 and a one revolution clutch 101 which receives a signal to operate the cranks intermittently in a manner to be set forth more fully hereinafter.

For a reason also to appear more fully hereinafter, there is also interposed between the one revolution clutch 101 and the cranks 93 and 97 a further reduction gear 102.

The motor 96 continuously drives one of the rack feed rolls, for example 35a, via endless belts 96a and 96b which pass over suitable pulleys for this purpose (FIG. 4).

*Bale Bag Transfer Arm Means (FIGS. 4, 10 and 13)*

Figures 10, 10A, 11:
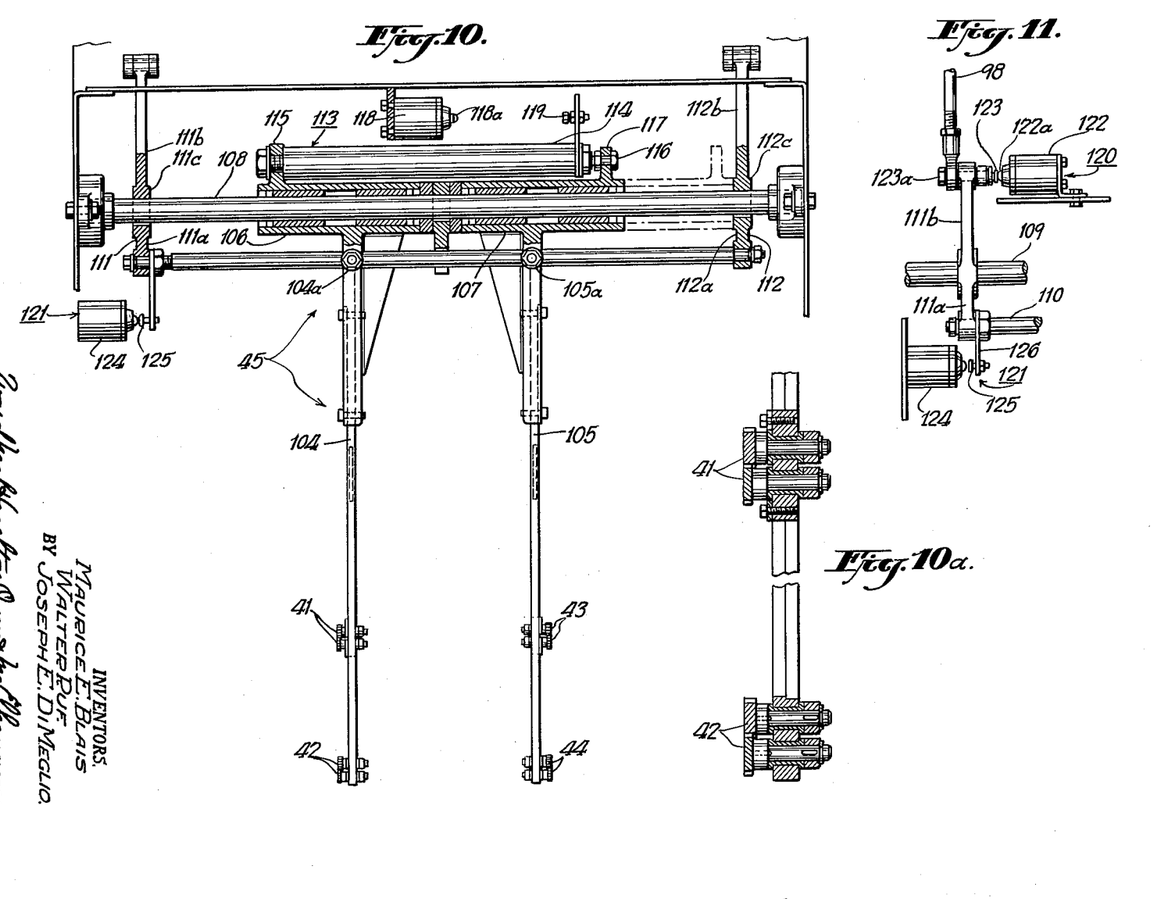
FIG. 10 is a front elevation of a bale bag transfer or applicator arm device employed in the present invention.
FIG. 10a is a fragmentary view of a part of a transfer arm of FIG. 10 and showing certain mechanical details of gripper finger control means.
FIG. 11 is a fragmentary view of certain valve means which are actuatable to control the sequence of certain of the elements of the present invention.

Referring in particular to FIG. 10, the transfer arm device 45 embraces a pair of transfer arms 104 and 105. On the arm 104 there are mounted the two pairs of gripper fingers or jaws 41 and 42, and on the arm 105 the gripper fingers 43 and 44.

The transfer arms 104 and 105, as shown in FIG. 10, are spaced apart a desired distance for the purpose of grasping the corner regions of a bale bag in the rack 36 as shown in FIG. 2. However, means are provided for mounting the transfer arms 104 and 105 so that they can be spread apart after the application of a bale bag to the duck bills 20 in order to enable a prompt return movement of such arms 104 and 105, but while maintaining same in parallel relation at all times.

The means for so mounting the transfer arms are as follows: The arms 104 and 105 are provided with collars 106 and 107, respectively, which are angularly shiftable about a shaft 108, and which are also axially movable upon such shaft within preselected limits of motion, as will be set forth more fully hereinafter. The collars 106 and 107 are separate elements and thus there must be provided suitable means for holding the arms 104 and 105 in parallel relationship while they shift angularly about the axis of the shaft 108.

Such means comprise a bar 110 which is mounted for planetary movement within selected limits about the axis of the shaft 108 while being held rigidly parallel to the axis of the latter shaft 108. Thus the bar 110 is rigidly secured to the corresponding extremities of a pair of crank levers 111 and 112 respectively having arms 111a, 111b and 112a, 112b respectively on opposite sides of collars 111c and 112c which embrace bar 110. Thus by angularly shifting together the crank levers 111 and 112, it will be seen that the transfer arms 104 and 105 will be correspondingly angularly shifted while being held in parallel relationship but nevertheless such arms 104 and 105 can be spread apart or brought close together within the limits of their axial motion limit-stops. This is accomplished by the bar 110 passing through aligned perforations 104a, 104b in the upper portions of the arms 104 and 105.

Angular motion is communicated to the crank levers 111 and 112 by means of links 98, one of which is shown and described above in connection with FIG. 4, such links being connected to the crank 97 and being angularly shiftable by means of the motor 96.

The means for spreading and closing the transfer arms 104 and 105, in the form shown, comprises a power cylinder device 113, one extremity of cylinder 114 of which is secured as by a yoke 115 to the collar 106, and a piston rod 116 of which is secured by a yoke 117 to the collar 107.

The power cylinder device 113 is provided with an air valve 118 which is actuatable by means of an adjustable finger 119, the latter being mounted upon the power cylinder 114 and thus being axially shiftable therewith. Axial spreading movement of the arms 104 and 105 thus will be communicated to the finger 119 which is positioned for engaging a valve actuating protrusion 118a of the valve 118 when the arms are spread apart.

The spreading apart of the transfer arms 104 and 105 which causes an actuation of the air valve 118 directs a signal to actuate the power cylinder 25 (FIG. 3) to raise the table 27, the sequence of events to be set forth more fully hereinafter.

Referring now to FIG. 11, there are shown two air valve devices generally designated 120 and 121. The air valve device 120 embraces an air valve 122 which is actuatable by an adjustable button 123 which is mounted for angular movement upon the crank arm 111b of the crank lever 111 (FIGS. 10 and 11). The air valve 122 is so positioned that the actuating button 123 will engage a protrusion 122a and actuate it under the following circumstances:

(a) A few degrees before the end of the clockwise angular movement of the transfer arm device 45 (for example, 2½° before a total sweep of 97½°) the button 123 actuates the air valve 122 thereby to direct a signal by suitable means (FIG. 13) to the gripper fingers 41–44 to open same and thereby to release the bale bag mouth which at this point will have been applied over the closed duck bills 21, 22 in the manner shown in FIG. 3; and (b) The actuation of the air valve device 120 also directs a signal by suitable means (FIG. 13) to the power cylinder 113 to spread apart the transfer arms 104 and 105 in order to permit them to clear the duck bills 21, 22 and the table 27 thereby to enable such transfer arms to return promptly to their initial or zero position at which point a fresh bale bag mouth can be grasped while in the spread apart bale bag rack 36.

The air valve device 121 embraces an air valve 124 and an actuating button 125, the latter button being angularly shiftable with the crank lever 111 and mounted upon an arm 126 which, in the form shown, is secured to the parallel bar 110.

The actuating button 123 preferably is coaxial with a bolt 123a which interconnects the link 98 with the crank lever 111.

The air valve device 121 is actuated while the transfer arm device 45 is en route to its most counterclockwise position, as viewed in FIG. 4 (also referred to as the zero position aforementioned) for the purpose of retracting the transfer arms 104, 105 to their narrow spaced condition (FIG. 10), thereby to prepare same en route during such angular motion to grasp a bale bag mouth by means of its several grippers 41–44.

Referring to FIG. 4, a further air valve device 127 is provided and is positioned in such a location that when the transfer arm device 45 has moved to its farthest position to the right, or counterclockwise, as viewed in this figure, the gripper fingers 41—44 will be closed upon the partially opened mouth of a bale bag in the bale bag rack 36. The closing of the gripper fingers 41–44 is accomplished, in the form shown, by means of a pair of power cylinder devices 128, there being one for each of the arms 104, 105. Power cylinder device 128 embraces a power cylinder 129 having a piston rod 130, the latter being operatively connected by suitable mechanical linkage (FIG. 10a) to the respective two pairs of gripper fingers. The mechanical linkage includes a rod 131 which is axially shifted by means of the piston rod 130 and which, by suitable mechanical interconnection (FIG. 10), can open and close such gripper fingers, depending upon the position of the piston rod 130.

*Operative Interconnection Between Table 27, Bale Bag Rack 36 and Transfer Arm Device 45*

There will now be described the operative interconnection between the table 27 over which the duck bills 21 and 22 are mounted (as shown in FIG. 3) and the means for controlling the one revolution clutch 101 which in turn governs the opening and closing of the bale bag rack 36 and also the angular shifting of the transfer arm device 45.

As viewed in FIGS. 3 and 4, there is schematically shown a switch 127 which is positioned to be actuated as a result of the angular shift of the table 27 from its uppermost position, as shown in solid lines in FIG. 3, to its dropped or lowermost position, as shown in broken lines in FIG. 3 (solid lines in FIG. 4). The actuation of the switch 127 creates a signal which initiates the operation of the entire apparatus. The transfer arm device 45 at this instant is at its zero or farthest counterclockwise position and at this instant has, within the grasp of its several gripper fingers 41–44, the open mouth of a bale bag.

Figure 5:
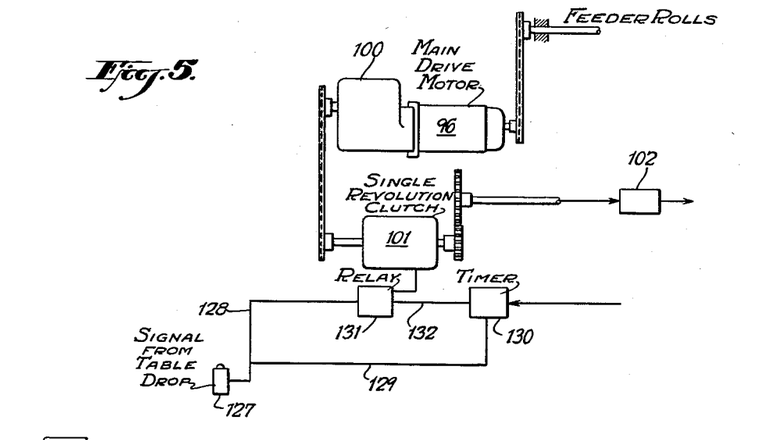
FIG. 5 is a schematic representation of a portion of a control means for the apparatus shown in FIG. 4.

Thus when the table 27 drops or falls angularly to its lowermost position and actuates the switch 127, a signal is directed to suitable control means shown in FIG. 5 for the one revolution clutch 101, this being schematically shown via an operative interconnection 128. Simultaneously a signal is directed via an operative interconnection 129 to a timer 130 which, after the expiration of a selected time interval, reactuates the one revolution clutch 101 via a relay 131, the latter relay receiving its signal not only from the itmer 130 but also from the switch 127 via the aforementioned operative interconnection 83.

The aforementioned relay 131 controls the operation of the one revolution clutch 101 by governing the position of its escapement element, the relay being capable of placing this escapement element in its operative or inoperative position. When an initiating signal is created by actuation of the switch 127, the one revolution clutch 101, via the relay 131, commences its first cycle comprising one revolution and thereby angularly shifts both of the cranks 93 and 97 (FIG. 4) concurrently through one-half of the cycle. The reduction gear 102 (FIGS. 4 and 5) above described serves the purpose of giving a desired ratio of movement between the one revolution clutch 101 and the cranks 93 and 97, wherein one full cycle of operation of such clutch produces only one-half cycle of operation of said cranks, and hence the first single revolution of the one revolution clutch 101 will accomplish the purpose of shifting angularly the transfer arm device 45 from its farthermost position counterclockwise (zero position) beneath the opened bale bag rack to the opposite extremity of its angular motion, namely, to the position shown in FIG. 4. Concurrently the one revolution clutch 101 will, via the crank 93 and the interconnecting link 95, cause the suction arms 85 to move the suction arms from the position represented by 79a in FIG. 7 to their closed position, as shown in FIG. 7, thereby to gain a grasp upon the opposite sides of a bale bag. Further angular motion of the crank 93 thereafter will spread apart the opposed pairs of suction arms 79, 80 and 81, 82 (FIG. 9a) and actuate the limit-stop device 86 (FIG. 7) to open the bale bag mouth partially and also to entrain and partially open the two sections of the bale bag rack (FIG. 8). Thus there is facilitated the withdrawal of the bale bag from the rack. About ⅞ of a second is required in this form of the apparatus for the angular transfer to take place wherein the open mouth of a bale bag is shifted from the bale bag rack onto the duck bills. Thereafter a selected delay, for example one second, is interposed in the further operation of the transfer arms for the purpose of providing adequate time for the next bale bag to be moved from the conveyor 28 up into the bale bag rack 36 via the pickup arm 31 and the rack feed rolls 35.

Accordingly, after the transfer arm device 45 has been angularly shifted to its leftmost position clockwise, as shown in FIG. 4, and before this device is returned to its original position, the timer 130 interposes said selected delay, in this case one second, whereupon via an interconnection 132 the relay 131 is reactuated, as aforementioned, to operate again the escapement mechanism of the one revolution clutch 101, whereupon the second single revolution of such clutch occurs and the transfer arm device 45 is swung back to its original position and the four pairs of gripper fingers 41–44 are positioned for grasping the open mouth of a new bale bag within the now partially opened bale bag rack.

Note that during the return swing of the transfer arm device 45 from its lowermost or most clockwise position (as shown in FIG. 1) to its uppermost or most counterclockwise position, the bale bag rack changes from a fully closed condition to a partially open one as represented by the line 133 (for section 38), this being several degrees less than the final open position 134 of such section 38.

*Operation*

The bale bag applicator apparatus comprising the present invention receives its motion primarily from the drive motor 96 which runs continuously and which is operatively connected via the reduction gear 100 (FIG. 5)

with the one revolution clutch 101 which operates intermittently under the influence of the switch 127 and the timer 130. The dropping of the baler table 27 initiates the operation of the apparatus and the latter will operate at a fixed speed, for example, at a rate of application of 20 bags per minute.

The sequence of operations is as follows:

(1) Empty bale bags in groups, say of 25 each, designated 29 (FIG. 1) are placed with their bottoms leading on the infeed conveyor 28. Such groups are overlapped in shingle attitude (as shown in FIG. 1) to increase the bale bag capacity of the infeed conveyor. The latter, via the motor 49, brings the groups of bale bags into the apparatus to position 30 for pickup by the pickup arm device 31. The side guides and the end plate 53 position the bags accurately for the pickup. The microswitch 52 directs a signal to the conveyor motor 49 to advance the next stack or group of bags 29 when a given stack has been exhausted.

(2) After a group of bags is in place at pickup station 30, the dropping of the baler table 27 creates a signal via the switch 127 directed to sequence control device 135 (FIG. 13) to actuate the pickup arm device 31.

The pickup arm device 31 thus lowers its piston rod 33, and suction is applied to the cups 33a to grip the top bag of a group thereof in the pickup station 30. The lefthand extremity of the bottom end of a bale bag thus is lifted well off of its group of bags to a position comprising the uppermost location of the piston rod 33. Responsive to the movement of the piston rod 33 to its uppermost position, a signal is created via the sequence control device 135 thereby to actuate the power cylinder means 34 which, via piston rod 34a, angularly shifts the pickup arm 31 about the axis of shaft 63 thereby angularly to advance the bottom of the bag upwards and to place the leading edge thereof between the two opened rack feed rolls 35a, 35b. In response to such angular movement of the pickup arm 31, there is actuated, for example, via an air valve 136 (FIG. 13), suitable signal-producing means included in the sequence control device 135 in turn to actuate the power cylinder 66 thereby to close or bring together the theretofore separated rack feeder rolls 35a, 35b thereby to advance the bag into the substantially vertical bale bag rack 36. As aforementioned, the bale bag is so advanced into the rack via the opening 68 and past an in-guide plate 69. The rack 36 is provided with suitable means for centering the bag therein comprising side guides thereby guiding the bale bag in its fall to its lowermost position, thus positioning the mouth or front edge of the bag resting upon corner floor plates 77, 78 (FIG. 8).

Figure 9:
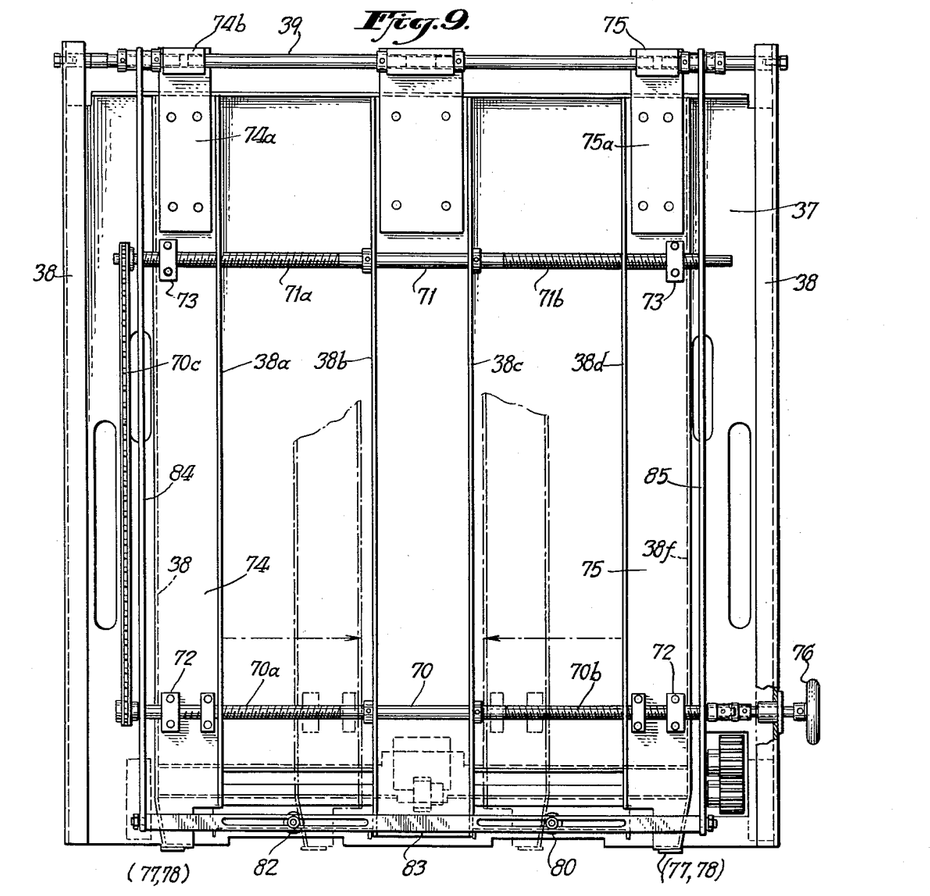
FIG. 9 is a front view of the rack shown in FIG. 7.
Figure 9A:
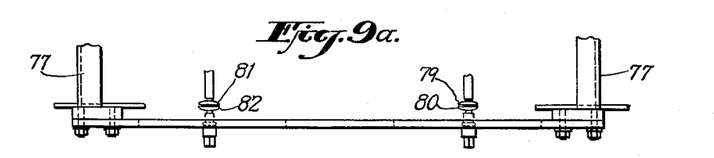
FIG. 9a is a fragmentary view of a portion of the bale bag opening suction means employed in the bale bag rack of FIGS. 7, 8 and 9.

(3) Referring to FIGS. 7, 9 and 9a, the position of the several bale bag mouth opening suction cups (79, 80 and 81, 82) are as represented in FIG. 7 in a separated condition symbolized by the position 79a of the cup 79 partially separated from its coacting suction cup 80. When the bale bag is so positioned in the rack 36, the two opposed pairs of suction cups 79, 80 and 81, 82 are brought together under the influence of the crank 93 and the suction arms 85 to engage the bag near the mouth thereof, for example, about one inch from its leading edge and slightly removed from the vertical side edges thereof. The actuation of the switch 127 via the relay 131 actuates the one revolution clutch 101 to accomplish the closing of the two opposed pairs of suction cups and via such crank 93 and its link 95 to shift angularly the suction arms 85 to spread open the mouth of the bag and concurrently to entrain the upper or pivotable section 38 of the rack 36 as described above in connection with the limit-stop device 86 (FIG. 7). The upper section of the rack thus will be opened and the mouth of the bag will be also opened approximately to a degree of two-thirds of the bale bag bottom width. The bale bag now is prepared to be gripped on its leading edge by the four gripper fingers 41–44 (FIG. 2) that are mounted upon the transfer arm device 45. Such gripper fingers 41–44 are already in position for gripping the partially open mouth of the bale bag and via the aforementioned valve device 127 (FIG. 4) such bale mouth gripper fingers are closed to snap shut upon the partially open bale bag mouth.

(4) The gripper fingers 41–44 mounted on the transfer arm device 45 embracing the transfer arms 104 and 105 are mounted for motion about the axis of the shaft 46 between the bale bag gripping station and the station of application of the open mouth of the bale bag upon the duck bills 21 and 22. When a signal from the falling table 27 is received via the switch 127 and the relay 131, the transfer arm device 45 with partially open bale bag firmly gripped in the gripper fingers thereof swings downwardly and applies the mouth of the bale bag over the duck bills. The gripper fingers open at a point approximately 2½° before the completion of the angular motion of the transfer arm device 45 which angular motion is, for example, about 97½°. Such opening of the gripper fingers allows the transfer arm device and fingers to be positioned slightly ahead of the leading edge of the bag. The transfer arms at this point are ready to be spread apart preparatory to the swing back to the initial position thereof. This is accomplished, as aforementioned, by air valve device 120 (FIGS. 11 and 13) which is operatively connected, as shown in FIG. 13, to the sequence control device and which creates a signal which actuates the power cylinder device 113 to spread apart the transfer arms 104 and 105 thereby enabling them to swing back and to clear the duck bills 21, 22 and the table 27.

The opening of the gripper fingers 41–44 and such spreading apart of the transfer arms 104, 105 are both brought about by the air valve device 120 via the sequence control device 135.

The transfer arms 104, 105 at this stage of the operation are not immediately returned to their rightmost position, as viewed in FIG. 4, that is, the position for grasping a fresh bale bag, but rather a delay is interposed in the return via timer 130 to permit a fresh bale bag to be placed in the bale bag rack 36. When this time interval has elapsed, the timer 130 via the relay 131 again actuates the one revolution 101 to cause the swing back of the transfer arm device 45. During such return motion, the air valve device 127 is actuated for the purpose of closing the bale mouth gripper fingers 41–44 as above described.

Figure 13:
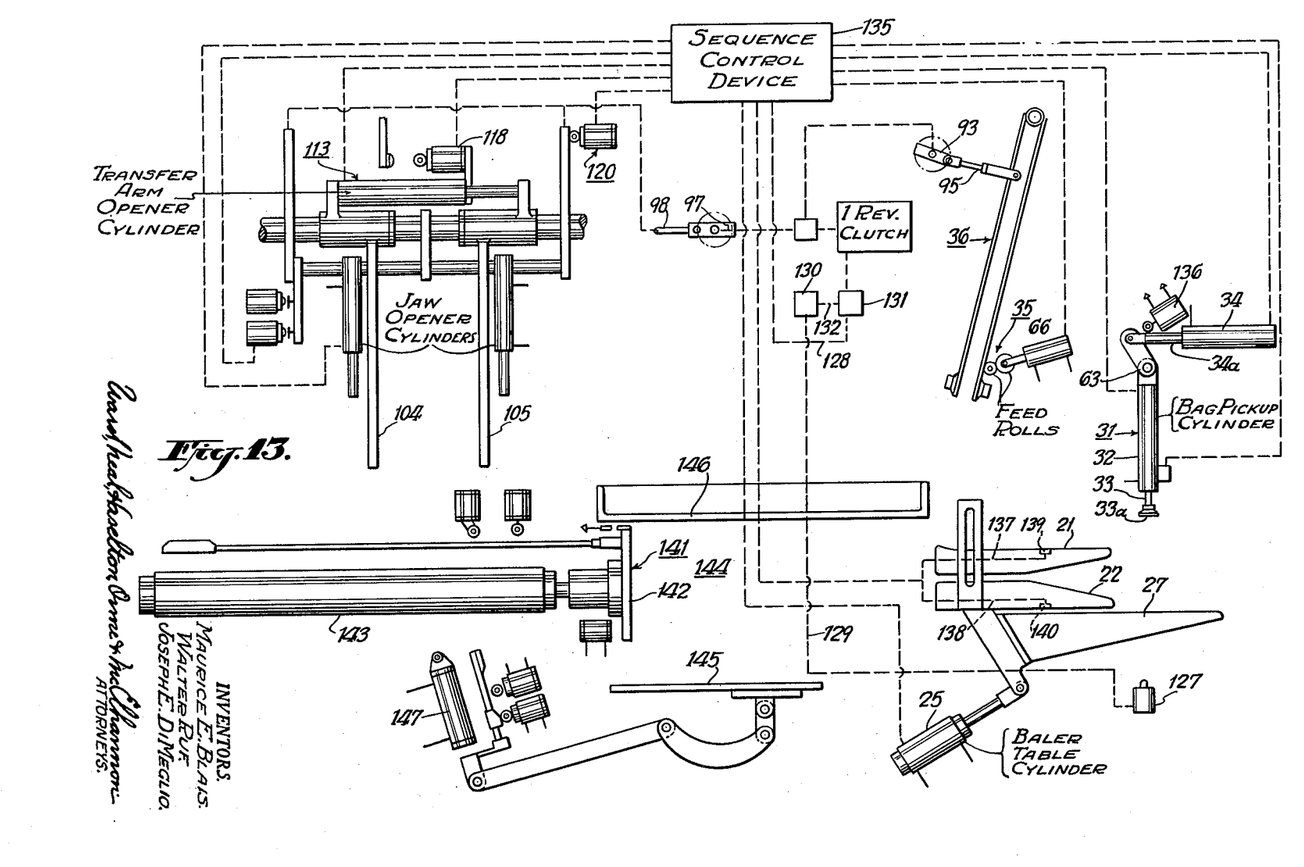
FIG. 13 is a schematic representation of one embodiment of the present invention showing certain of the parts thereof illustrated in the previous figures.

(5) As shown in FIG. 13, means are provided for sensing whether or not a bale bag mouth is properly positioned over the duck bills 21, 22, such system in the form shown comprising an air pressure sensing system although other media may be used for sensing the proper positioning of the bag. In this form, suitable air conduits, such as 137 and 138, direct air under pressure to orifices, such as 139 and 140 respectively, situated in the outermost surfaces of their respective duck bills 21 and 22 in such a position that a bale bag which is torn or not properly seated upon the open or expanded duck bills will fail to interrupt the flow of air through the orifices 139 and 140. If no bale bag is positioned upon the duck bills or if a torn bale bag is thereupon, the pressure of the fluid medium in the conduits 137 and 138 assumes a value which arrests temporarily the operation of the apparatus. For example, the closing of the orifices 139 and 140 by the proper positioning of a bale bag mouth thereover will cause an increase in the pressure to a selected degree thereby to create a signal which permits the further operation of the apparatus. For example, the ramming of a charge of small bags into the large bale bag upon the duck bills, via ram means 141 having a ram plate 142 and a power cylinder 143, such charge being located in station 144. The charge of material or group of small bags can be compacted or pressed together via a side compression plate 145 which is movable toward and away from a fixed compression plate 146 by means of a power cylinder 147. The aforementioned elements are suitably operatively connected to the sequence control device 135. In particular, the ram means 142, 143 are in operative interconnection with the sequence control device 135 thereby to arrest the motion of the ram in the event that a torn or defective bale bag mouth is applied to the duck bills 21, 22 and the sensing device 139 and 140 senses the imperfection in the bale bag.

The operation of the bale bag applicator apparatus above described can be divided into three time intervals. The total time required for a complete cycle is, for example, 2¾ seconds although this may be adjusted to shorten or lengthen same. The three time intervals are as follows:

At the time that the table 27 is lowered, the single revolution clutch 101 is actuated thereby starting the first time interval and the timer 130 is simultaneously actuated. The operation of the clutch 101 is initiated via the relay 131 and it will complete one revolution in, for example, ⅞ of a second. The time set upon the timer 130 will expire at the end of 1⅞ seconds and will again actuate the one revolution clutch 101. The latter clutch will accomplish one further cycle and thus make another revolution consuming a further ⅞ of a second and the cycle will be complete aggregating 2¾ seconds.

Figure 12:
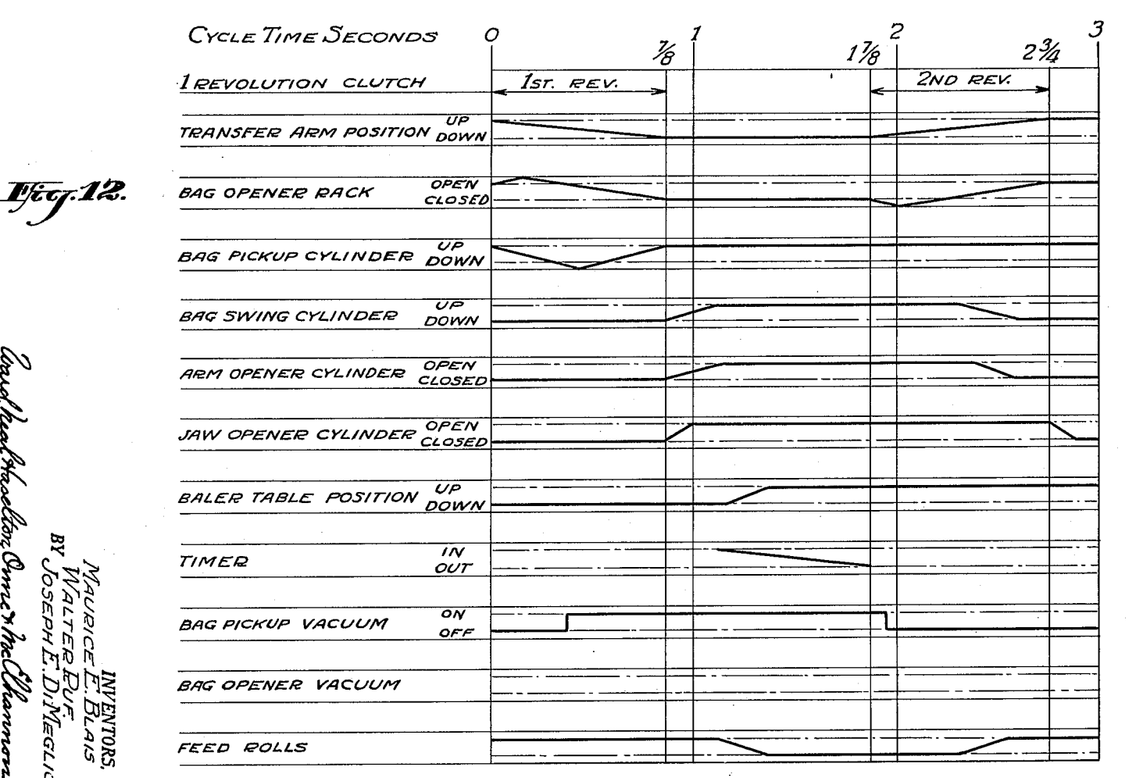
FIG. 12 is a graphical representation of the relative positions of certain of the elements of the present invention during the time of one complete operating cycle thereof.

Referring now to FIG. 12, during time interval No. 1 (⅞ of a second) the following occurs: At the signal from the dropping of the baler table 27, the one revolution clutch 101 makes a single revolution. The single revolution of this clutch is reduced by ½ by means of the reduction gear 102 (FIG. 4) thereby causing ½ cycle of operation of the cranks 93 and 97. The crank 97 swings the transfer arm device 45 with its jaws closed on the mouth of a bale bag down over the duck bills 21 and 22. 2½° before the end of this angular movement, such jaws are opened and the bale bag, which now has been applied over the duck bills, is freed from the gripper fingers and held upon the duck bills by means of a spring, such as 21a (FIGS. 1 and 3). The crank 93 during this time provides motion to the upper section of the bale bag rack 36. At the outset of this particular time interval, the bale bag rack was opened to a degree approximating ⅔ of the bottom width of a bale bag. The first motion via the crank 93 will be further to open the upper section of the rack to facilitate a smooth removal of the partially opened bale bag from such rack. The upper section of the rack then via the crank 93 is closed onto the lower section 37 of the bale bag rack 36. At this point in the operation, the opposed pairs of suction cups 79, 80 and 81, 82 (FIG. 9a) are spaced from one another and clear of the path of a bale bag which can thus move downwardly to its bottom-most position within the rack.

At the beginning of this first time interval, the bale bag pickup suction cups 33a of the arm 31 are in a raised position overt he bale bags. At the starting signal, the suction cups 33a are lowered onto the top bale bag and after the expiration of ½ second with a bale bag held by the suction cups, the power cylinder 31 lifts the bale bag to its upper fixed position. Immediately prior to the expiration of the ⅞ of a second time interval and running into the second time interval set forth below, the second power cylinder device 34 is actuated to swing the bale bag up so that the leading edge thereof is positioned to spread apart the forwarding rolls 35. When the bale bag reaches this point, the forwarding rolls close, as aforementioned, and advance the bag into the rack whereupon the bag falls down onto the corner floor plates or positioning stops 77, 78 (FIG. 8).

At the beginning of this first time interval, the timer, as aforementioned, is actuated and the timer is set so that its time interval expires at 1⅞ seconds.

The time interval No. 2 comprises 1 second and commences at the expiration of time interval No. 1 at which time a bale bag is positioned in its bottommost location within the bale bag rack 36. During this second time interval, the transfer arms 104, 105 (of the transfer arm device 45), which are positioned over the duck bills at the end of the time interval No. 1, are spread apart to straddle and clear the table 27 and the duck bills in preparation for their return angular motion to the bale bag rack. When the transfer arms 104, 105 are opened, via the signal-producing device embracing the air valve means 118 (FIGS. 10 and 13) a signal is created via the sequence control device 135 to the power cylinder 25 (FIGS. 3 and 13) to cause the baler table 27 to come up and to resume its horizontal position (FIG. 3). The upper section 38 of the bale bag rack 36 at this time undergoes no activity.

During time interval No. 3, which is ⅞ of a second, the following occurs: This time interval commences when the time set on the timer 130 expires. The one revolution clutch 101 is again actuated via the relay 131 and is thus caused to rotate causing a reactuation of the two cranks 93 and 97, causing such cranks to complete the second half of their revolution. The crank 93 at this time is actuated to cause the upper section 38 of the rack 36 to shift angularly to press together the opposed pairs of suction cups 79, 80 and 81, 82 as aforementioned, thereby to press therebetween a bale bag mouth. The bale bag mouth is thereafter opened to the degree comprising ⅔ of the bottom width of a bale bag as mentioned above and the bale bag is then ready to be gripped at the end of this third time interval. The crank 97, which motivates the transfer arm device 45 during this time interval, angularly shifts the transfer arms 104, 105 back to grip the next bale bag mouth. When such arms 104, 105 are well above the table level, the air valve device 121 (FIG. 11) is actuated to retract the transfer arms to their relatively narrow spacing which is required for gripping the mouth of the particular bale bag within the rack. When the transfer arms are in their farthest position in a counterclockwise direction and the open gripper fingers are in position for gripping the bag, the signal is created via the air valve device 127 to snap such fingers shut and thereby grip the open mouth of the bale bag. The transfer arm device and such bag mouth grippers at this point have reached the end of their cycle of operation.

At the beginning of the aforementioned time interval No. 3, the bale bag pickup means 31 was located in its uppermost position at the rack feed rolls 35 and during this time interval it is necessary for the pickup arm device to be returned via counterclockwise motion to its position vertically above a stack of bags and concurrently to open or spread apart the forwarding rolls 35.

It will be understood that the term "bale bag" as used herein has reference to bags useful for packaging bulky goods generally.

What is claimed is:

1. In apparatus of the class described, a pair of bill-like elements mounted for opening and closing movement, said elements when closed being adapted for having the mouth of a bale bag thrust thereover whereby such elements are positioned within the mouth of the bale bag, said elements then being openable to hold the bale bag thereon while the latter is filled with a charge which is thrust through such bill-like elements; a bale bag rack formed for holding a bale bag and positioned above said bill-like elements; a bale bag applicator device, including bale bag applicator arms mounted for movement between a position wherein it can receive a bale bag from said rack and a position wherein it can apply the open mouth of the bale bag over said bill-like elements; means for so moving said bale bag applicator device; said applicator device having gripper means for gripping the mouth of the bale bag and holding same in spread condition; means for picking up one bale bag at a time from a supply thereof and inserting same in said bale bag rack; and means for coordinating the sequence of operations of the aforementioned parts of said apparatus.

2. In apparatus of the class described, a pair of bill elements mounted for opening and closing movement, said elements when closed being adapted for having the mouth of a bale bag thrust thereover whereby such elements are positioned within the mouth of the bale bag, said elements then being openable to stretch open the mouth of the bale bag thereon for the filling of the bale bag with a charge which can be thrust through such bill elements; a bale rack formed for holding a single bale bag and positioned near said bill elements; means for spreading apart portions of said rack and concurrently spreading open the mouth of a bale bag therein; a bale bag applicator device, including bale bag applicator arm means mounted for movement between a position wherein it can receive a bale bag from said rack and a position wherein it can apply the open mouth of such bale bag over said bill elements; means for so moving said bale bag applicator device; said bale bag applicator device having gripper means for gripping the spread mouth of a bale bag in said rack and holding same in spread condition; means for picking up one bale bag at a time from a supply thereof and inserting same in said bale bag rack; and means for coordinating the sequence of operations of said aforementioned parts of the apparatus.

3. In apparatus of the class described, a pair of channel-like elements mounted for relative opening and closing movement, said channel-like elements being formed for having slipped thereover the mouth of a bale bag, the latter being thus adapted to be filled by a charge of material inserted therein via such channel-like elements, a bale bag rack formed for holding a bale bag in readiness to be so applied to said channel-like elements; means for grasping a bale bag from said bale bag rack, holding the mouth thereof open and applying it over said channel-like elements, said means including bale bag applicator arm means mounted for movement for the aforementioned purpose between a position wherein it can receive and grasp a bale bag from said rack and another position wherein it can so apply the open mouth of the bale bag; means for moving said arm means between said positions; said arm mounting bale bag mouth holding means for grasping the mouth of a bale bag theretofore positioned in said bale bag rack; means for opening the mouth of the bale bag prior to its application to said channel-like elements; means for inserting bale bags consecutively in said bale bag rack; means for sensing the presence of a defective or torn bale bag mouth as applied over said channel-like elements, and comprising means for sensing a change of pressure responsive to a loose fit of the mouth of a bale bag fitted over said channel-like elements when said elements are in relatively open condition; control means for controlling the sequence of operation of the several parts of the apparatus above mentioned, said control means being operatively connected to said sensing means for temporarily rendering inoperative the apparatus in response to the sensing of such loose fit of a bale mouth applied to said channel-like elements.

4. In apparatus of the class described, a generally upstanding bale bag rack; means for moving into such rack a bale bag of the open mouth type with the mouth thereof down; said bale bag rack comprising two sections; means for mounting said sections for spreading movement to permit a bale bag in the rack to be opened at least at the lower end thereof, said bale bag rack having floor portions situated at the corners thereof for supporting parts of the lower edge of a bale bag in the rack, such bale bag being in a flattened condition; means for gripping opposite sides of the mouth of a bale bag in said rack and for partly spreading it open to a selected degree while concurrently spreading such rack sections at least at the lower end thereof, such spreading of the bale bag mouth opening same whereby the width thereof is reduced a sufficient degree to move the mouth out of engagement with said rack floor portions; a pair of bill-like bale bag mouth spreading elements mounted for relative movement from a closed position in which an open mouthed bale bag can be inserted thereover to to an open position in which such bale bag mouth is fully spread open; a transfer arm device including two transfer arms, each of such arms having two pairs of gripper jaws for grasping a partly opened bale bag mouth at the corner regions thereof while in said rack; and means for moving said transfer arm device from a primary station in which such jaws grasp such bale bag mouth in said rack, to a secondary station in which it applies the bale bag mouth over the bill-like elements when the latter are in a closed position.

5. In apparatus of the class described, an upwardly directed bale bag rack; means for moving into such rack a bale bag of the open mouth type; said bale bag rack comprising two sections, means for mounting said sections for spreading movement to permit a bale bag in said rack to be opened at least at the lower end thereof; means for gripping opposite sides of the mouth of a bale bag in said rack and for partly spreading it open to a selected degree while concurrently spreading such rack sections at least at the lower end thereof; a pair of bill-like bale bag mouth spreading elements mounted for relative movement from a closed position in which the mouth bale bag can be inserted thereover to an open position in which such bale bag mouth is fully spread open; a transfer arm device having two pairs of gripper jaws for grasping the partly opened bale bag mouth at the corner regions thereof; and means for moving said transfer arm device from a primary station in which such jaws can grasp such bale bag mouth while in the rack, to a secondary station in which it applies the bale bag mouth over the bill-like elements when the latter are in a closed position.

6. Apparatus in accordance with claim 4, including means for releasing said bale bag mouth by opening said jaws responsive to a preselected extent of movement of said transfer arms.

7. Apparatus in accordance with claim 6 including a table element beneath said bill-like elements mounted for movement between upper and lower positions; means responsive to movement of said transfer arms to a selected position for raising said table from its lower to its upper position; means responsive to such raising of the table for spreading apart said two transfer arms of the transfer arm device; means for returning said arms to said primary station for grasping a fresh bale bag in said bale bag rack; and means for closing said arms to their normal unspread relation during such return movement.

8. Apparatus in accordance with claim 6 including means responsive to movement of said transfer arms to a selected position for moving said bill-like elements to said open position; means responsive to such opening of said elements for spreading apart said two transfer arms of the transfer arm device; means for returning said arms to said primary station for grasping a fresh bale bag in said bale bag rack; and means for closing said arms to their normal unspread spaced relation.

9. In apparatus of the class described, a generally upright bale bag rack having a bale bag inlet opening in the lower portion thereof for receiving a flat unopened bale bag, said rack including a primary and a secondary section which comprise opposite sides of said rack, means for mounting said sections for relative movement to open and close same, means for opening and closing said rack sections, said sections of said rack having corner floor plates secured thereto for supporting the opposite end portions of a flattened unopened bale bag positioned in said rack, the mouth of such bale bag being down and the bottom thereof being up, said bale bag being of maximum width when thus flat and unopened as aforementioned, means grasping a bale in said rack on opposite sides thereof near the mouth and partly opening same to a selected degree concurrently with the actuation of said means for opening said rack sections, thereby to reduce the width of the bale bag therein to a degree whereby it is disengaged from and out of the path of said rack corner floor plates and therefore positioned for removal from the bottom of said rack; means for advancing unopened flattened bale bags in succession into such rack and comprising rack feed rolls, means for mounting said rolls for parallel reciprocal relative movement between spaced apart and engaging positions, means for rotating one or both of such rolls, means for inserting one end of a bale bag between said rack feed rolls when the latter are in such spaced apart relation, means for closing said feed rolls and rotating same to advance a bale bag therebetween into said rack, the bale bag falling mouth first onto said corner floor plates and resting there, the rack sections being then in closed condition; a pair of bill-like elements, means for mounting said elements for relative movement between open and closed positions; bale bag transfer means for removing a bale bag from said rack and fitting the open mouth thereof over said bill-like elements thereby to apply the bale bag thereto, and comprising: a pair of transfer arms, means for mounting said transfer arms for movement between a primary station in which it is adjacent to and can grasp a bale bag in said rack, and a secondary station in which can apply the bale bag to said bill-like elements, means for moving said arms between said stations, four pairs of bale bag mouth grippers mounted on said transfer arms and positioned thereon for receiving, when all are open, the corner edge portions of the mouth of a bale bag when the latter is opened in response to the opening of said rack sections, means for mounting said transfer arms for movement between spread and retracted positions while holding same parallel to one another, said transfer arms being movable from said primary to said secondary stations when in such retracted condition; means responsive to the closing of said bill-like elements for moving said transfer arms, when in said secondary station, from said retracted to said spread condition, thereby to permit said arms to return to said primary station, means for actuating said transfer arm moving means for so moving said arms to said primary station, means for retracting said arms to their unspread condition responsive to movement thereof from said secondary to said primary stations; and means for controlling the sequence of operation of the aforementioned parts of the apparatus.

10. In apparatus of the class described, an upwardly directed bale bag rack having a bale bag inlet opening in the lower portion thereof for receiving a flat unopened bale bag; said rack having means for supporting a flattened unopened bale bag positioned in the rack, the mouth of such bale bag being down and the bottom thereof being up; means for advancing unopened flattened bale bags in succession into such rack via said opening comprising a pair of rack feed rolls, means for mounting said rolls for parallel reciprocal relative movement between spaced apart and closed positions, means for rotating one or both of such rolls, means for inserting one end of a bale bag between said rack feed rolls when the latter are in such spaced apart relation, means for closing said feed rolls and rotating same to advance a bale bag therebetween into said rack bottom first, the bale bag falling mouth first onto said bale bag support means; a pair of bill-like elements, means for mounting said elements for relative movement between open and closed positions; bale bag transfer means for removing a bale bag from said rack and fitting the open mouth thereof over said bill-like elements thereby to apply the bale bag thereto, and comprising: a pair of transfer arms, means for mounting said transfer arm means for movement between a primary station in which it is adjacent to and can grasp a bale bag in said rack, and a secondary station in which it can apply the bale bag to said bill-like elements, means for moving said transfer arm means between said stations, bale bag mouth gripper means mounted on said transfer arm means and positioned thereon for engaging the mouth of a bale bag in said rack, and means for controlling the sequence of operation of the aforementioned parts of the apparatus.

11. In apparatus of the class described, the combination comprising: means for supporting a stack of flat, empty, open mouth bale bags, means for engaging one of said bale bags at a time and withdrawing same from the stack consecutively, a bale bag rack for holding a single bale bag, such rack being upwardly directed, means for urging an empty bale bag bottom first from such stack and upwardly into such bale rack whereby the bale bag in the rack is mouth down, bill-like elements for releasably holding open the mouth of a bale bag, and means for grasping each bale bag in said rack, opening the mouth thereof and applying same over said bill-like elements.

12. In apparatus of the class described, the combination comprising: means for supporting a stack of flat, empty, open mouth bale bags, means for engaging one of said bale bags at a time and withdrawing same from the stack consecutively, a bale bag rack for holding a single bale bag, such rack being generally upstanding, means for urging an empty bale bag bottom first from such stack and upwardly into such bale rack whereby the bale bag in the rack is mouth down, bill-like elements for releasably holding open the mouth of a bale bag, and means for grasping each bale bag in said rack, moving same and applying same over said bill-like elements, said grasping means opening the mouth of the bale bag while in transit.

13. In apparatus of the class described, the combination comprising: a bale bag stack supporting device for holding a plurality of flat, empty bale bags, a generally upwardly directed bale bag rack for holding one bale bag at a time, said bale bag rack being positioned for receiving an empty bale bag near the lower extremity thereof through an entrance formed therein, means for urging an empty bale bag through such entrance and upwardly into the bale bag rack, the bale bag then being in an inverted position with its mouth thereof directed downwardly and the bottom thereof upwardly, means for holding open the mouth of such a bale bag and comprising a pair of bill-like elements mounted for movement relative to one another, the mouth of a bale bag being applicable to such mouth-holding means when such bill-like elements are in relatively closed condition, means for moving said bill-like elements relative to one another to open same from a closed condition, and means for grasping an empty bale bag in said bale bag rack, moving same mouth first, and applying the mouth thereof over the bill-like elements, the latter being in relatively closed condition.

References Cited in the file of this patent

UNITED STATES PATENTS

| | | |
|---|---|---|
| 2,350,666 | Allen | June 6, 1944 |
| 2,649,235 | Edmonds | Aug. 18, 1953 |
| 2,810,999 | Spriggs | Oct. 29, 1957 |
| 2,926,475 | Lee | Mar. 1, 1960 |
| 2,950,589 | Litchard | Aug. 30, 1960 |